United States Patent
Lin et al.

(10) Patent No.: US 11,194,431 B2
(45) Date of Patent: Dec. 7, 2021

(54) DISPLAY DEVICE AND METHOD FOR DRIVING THE SAME

(71) Applicant: Xiamen Tianma Micro-Electronics Co., Ltd., Xiamen (CN)

(72) Inventors: Fuyin Lin, Xiamen (CN); Zhixin Chen, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 17/214,064

(22) Filed: Mar. 26, 2021

(65) Prior Publication Data

US 2021/0216165 A1    Jul. 15, 2021

(30) Foreign Application Priority Data

Jan. 4, 2021    (CN) .......................... 202110003612.6

(51) Int. Cl.
*G06F 3/044* (2006.01)
*G06F 3/041* (2006.01)

(52) U.S. Cl.
CPC .......... *G06F 3/0443* (2019.05); *G06F 3/0412* (2013.01); *G06F 3/04166* (2019.05)

(58) Field of Classification Search
CPC combination set(s) only.
See application file for complete search history.

(56) References Cited

U.S. PATENT DOCUMENTS

| | | | |
|---|---|---|---|
| 9,910,549 B2 * | 3/2018 | Lee ......................... | G06F 3/044 |
| 10,712,847 B2 * | 7/2020 | Kim ....................... | G06F 3/0412 |
| 10,845,910 B1 * | 11/2020 | Lin ........................ | G06F 3/0446 |
| 10,877,613 B2 * | 12/2020 | Lee ....................... | G06F 3/04164 |
| 2015/0116263 A1 * | 4/2015 | Kim ....................... | G06F 3/0443 345/174 |
| 2017/0168629 A1 * | 6/2017 | Lai ....................... | G06F 3/04164 |
| 2018/0059832 A1 * | 3/2018 | Cho ....................... | G09G 3/3648 |
| 2018/0113559 A1 * | 4/2018 | Bae ....................... | G06F 3/0412 |
| 2018/0196573 A1 * | 7/2018 | Kang ..................... | G06F 3/04184 |
| 2019/0179484 A1 * | 6/2019 | Jang ....................... | G06F 3/044 |

FOREIGN PATENT DOCUMENTS

| | | |
|---|---|---|
| GN | 103135816 A | 6/2013 |
| GN | 103473989 B | 6/2016 |

* cited by examiner

*Primary Examiner* — Ricardo Osorio
(74) *Attorney, Agent, or Firm* — Christensen O'Connor Johnson Kindness PLLC

(57) ABSTRACT

A display device and a method for driving the same are provided. Touch electrode groups of a display panel of the display device correspond to the touch switch groups in one-to-one correspondence, each touch electrode group includes d touch electrodes subgroups arranged in a first direction, each touch switch group includes multiplexers, and each multiplexers includes m input terminals, and n output terminals electrically connected to the touch electrodes in one-to-one correspondence, where d=n/m. One touch analog front end group corresponds at least two touch pin groups. In one touch pin group and one touch analog front end group corresponding thereto, every two touch analog front ends are electrically connected to a same number of the touch pins. In one touch pin group and one touch switch group corresponding thereto, every two touch pins are electrically connected to a same number of the input terminals.

17 Claims, 10 Drawing Sheets

DISPLAY DEVICE AND METHOD FOR DRIVING THE SAME

CROSS-REFERENCE TO RELATED APPLICATIONS

The present disclosure claims priority to Chinese Patent Application No. 202110003612.6, filed on Jan. 4, 2021, the content of which is incorporated herein by reference in its entirety.

TECHNICAL FIELD

The present disclosure relates to the field of display technology, and in particular, to a display device and a method for driving the display device.

BACKGROUND

Display devices integrated with a touch recognition function have become common in the field of display technology and are becoming more and more popular.

Conventionally, the number of the touch pins of a touch driving unit is the same as the number of the touch electrodes of a display panel, and in the display panel, the number of pins bound to the touch pins is also the same as the number of touch electrodes. As the number of touch electrodes increases with the increasing demand of recognition accuracy of touch function, the number of touch-related pins in the display panel also increases, which increases the design difficulties of fan-shaped wirings in the display panel and realizing a narrow bezel.

SUMMARY

In a first aspect, an embodiment of the present disclosure provides a display device including a display panel and a touch driving unit. The display panel includes a plurality of touch electrode groups and a plurality of touch switch groups that is arranged in one-to-one correspondence with the plurality of touch electrode groups. Each of the plurality of touch electrode groups comprises d touch electrode subgroups arranged along a first direction, each of the d touch electrode subgroups comprises a plurality of touch electrodes arranged along a second direction, and the first direction intersects with the second direction. Each of the plurality of touch switch groups includes a plurality of multiplexers, each of the plurality of multiplexers includes n touch switches, m input terminals, and n output terminals. The n touch switches are electrically connected to the n output terminals in one-to-one correspondence, where d, m, and n each are a positive integer and d=n/m. The touch electrodes of one of the plurality of touch electrode groups are electrically connected to the output terminals of one of the plurality of touch switch groups in one-to-one correspondence, and the one of the plurality of touch switch groups corresponds to the one of the plurality of touch electrode groups. The touch driving unit includes a plurality of touch pin groups and at least one touch analog front end group, each of the at least one touch analog front end group is arranged in correspondence with at least two touch pin groups of the plurality of touch pin groups, each of the plurality of touch pin groups includes a plurality of touch pins, and each of the at least one touch analog front end group includes a plurality of touch analog front ends. In one of the plurality of touch pin groups and one of the at least one touch analog front end group corresponding thereto, every two touch analog front ends of the touch analog front end group are electrically connected to a same number of the touch pins of the plurality of touch pin groups. The plurality of touch pin groups is arranged in one-to-one correspondence with the plurality of touch switch groups. In one of the plurality of touch pin groups and one of the plurality of touch switch groups corresponding thereto, the input terminals of the touch switch group are electrically connected to the touch pins of the touch pin group and every two touch pins of the touch pin group are electrically connected to a same number of the input terminals of the touch switch group.

In a second aspect, an embodiment of the present disclosure also provides a method for driving the display device provided in the first aspect to drive the display device to recognize touches. The method includes turning on the n touch switches of each of the plurality of multiplexers in a touch recognition phase.

BRIEF DESCRIPTION OF DRAWINGS

In order to more clearly illustrate technical solutions in embodiments of the present disclosure, the accompanying drawings used in the embodiments are briefly introduced as follows. It should be noted that the drawings described below are merely part of the embodiments of the present disclosure, and those skilled in the art can also acquire other drawings according to the follow drawings.

DESCRIPTION OF EMBODIMENTS

For better understanding the technical solutions of the present disclosure, embodiments of the present disclosure will be described in detail below with reference to the accompanying drawings.

It should be noted that the described embodiments are merely part of embodiments of the present disclosure, but not all embodiments. All other embodiments obtained by those skilled in the art according to the embodiments of the present disclosure fall into the protection scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that the term "and/or" used herein is merely an association relationship describing associated objects, indicating that there may be three relationships, for example, A and/or B may indicate three cases, i.e., A alone, A and B, or B alone. In addition, the character "/" herein generally indicates that the related objects before and after the character form an "or" relationship.

In the description of this specification, it should be understood that the words "basically", "approximately", "about", "generally" and "substantially" described in the claims and embodiments of the present disclosure refer to a value within a reasonable process operation range or tolerance range that can be generally agreed, rather than an exact value.

It should be understood that, although the set of touch electrode groups can be described using the terms of "first", "second", etc., in the embodiments of the present disclosure, the set of touch electrode groups will not be limited to these terms. These terms are merely used to distinguish the set of touch electrode groups from each other. For example, without departing from the scope of the embodiments of the present disclosure, a first set of touch electrode groups can also be referred to as a second set of touch electrode groups, and similarly, a second set of touch electrode groups can also be referred to as a first set of touch electrode groups.

Figure 1:
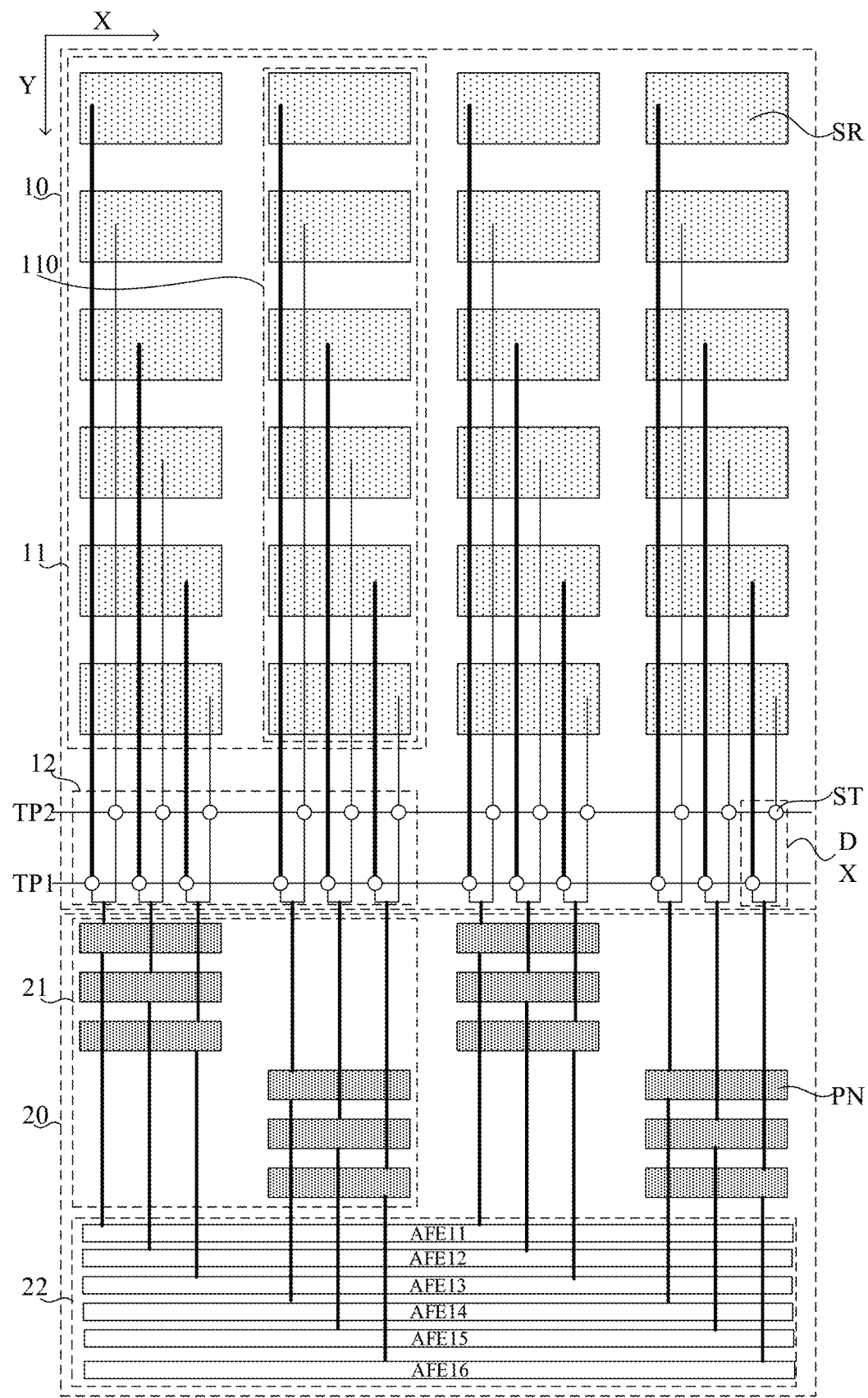
FIG. 1 is a schematic diagram of a display device provided by an embodiment of the present disclosure.
Figure 2:
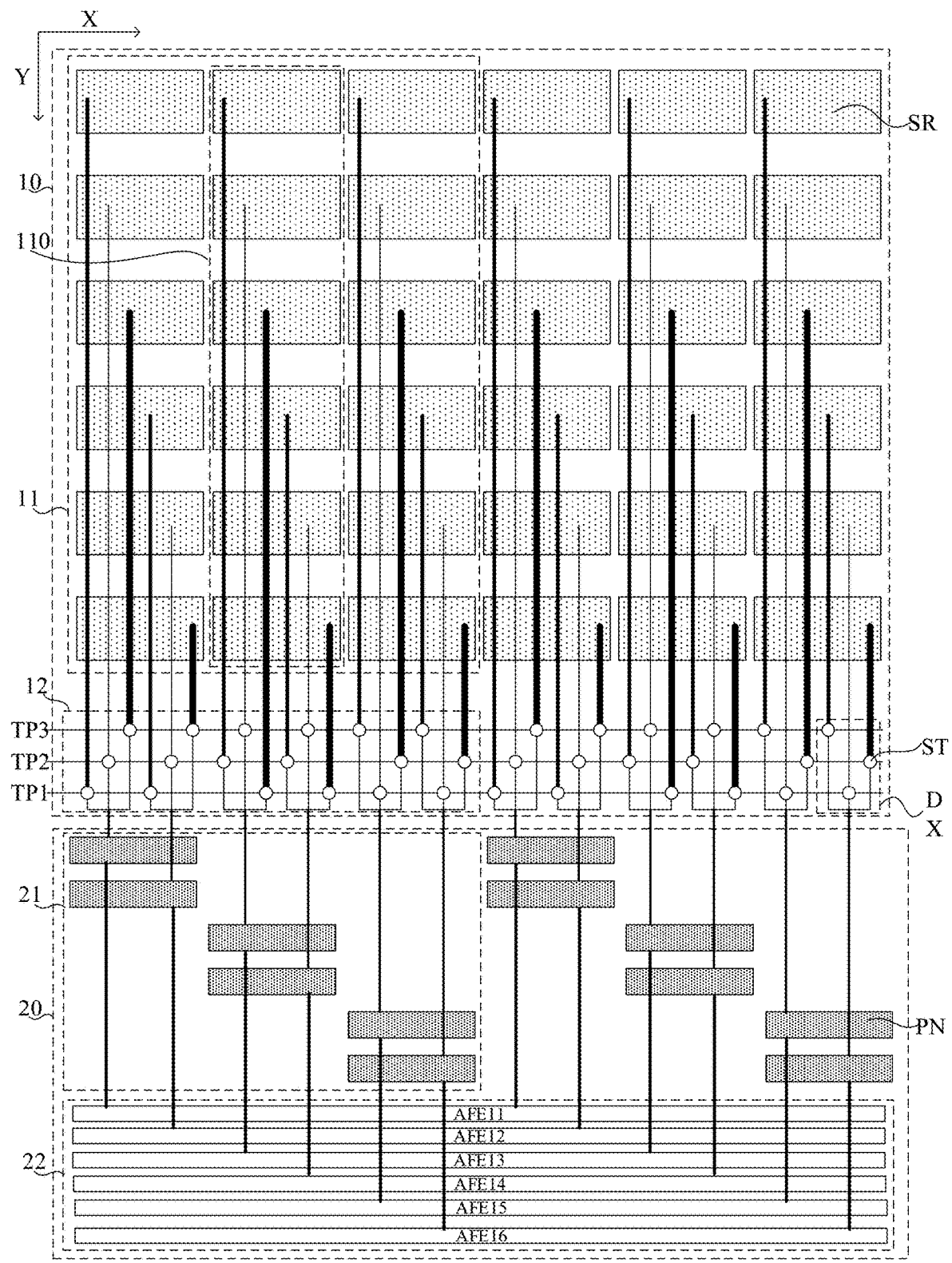
FIG. 2 is a schematic diagram of a display device provided by an embodiment of the present disclosure.

FIG. 1 is a schematic diagram of a display device provided by an embodiment of the present disclosure, and FIG. 2 is a schematic diagram of a display device provided by an embodiment of the present disclosure.

As shown in FIG. 1 and FIG. 2, the display device provided by the embodiments of the present disclosure includes a display panel 10 and a touch driving unit 20, the touch driving unit 20 is bound to the display panel 10 and is configured to receive signals related to touch from the display panel 10 and/or output signals related to the touch to the display panel 10 and process the touch signals. That is, the display device provided by embodiments of the present disclosure is a display device integrated with a touch recognition function.

The display panel 10 includes a plurality of touch electrode groups 11 and a plurality of touch switch groups 12, and the plurality of touch electrode groups 11 is arranged in one-to-one correspondence with the plurality of touch switch groups 12. FIG. 1 and FIG. 2 each schematically show two touch electrode groups 11 and two touch switch groups 12, and the number of touch electrode groups 11 and the number of touch switch groups 12 in an actual product can be more than two.

The touch electrode group 11 includes d touch electrode subgroups 110 arranged along a first direction X, and the touch electrode subgroup 110 includes a plurality of touch electrodes SR arranged along a second direction Y. The first direction X intersects the second direction Y, and d is a positive integer greater than or equal to 2.

The touch switch group 12 includes a plurality of multiplexers DX, each multiplexer DX includes n touch switches ST, m input terminals and n output terminals, the n touch switches ST are electrically connected to the n output terminals, respectively, and each of the m input terminals is electrically connected to n/m touch switches ST. That is, in the touch switch group 12, the number of the input terminals of one of the plurality of multiplexers DX is equal to the number of the input terminals of any one of the remaining multiplexers of the plurality of multiplexers DX, the number of the output terminals of one of the plurality of multiplexers DX is equal to the number of the output terminals of any one of the remaining multiplexers of the plurality of multiplexers DX. In each multiplexer DX, each input terminal corresponds to a same number of the output terminals. The multiplexer DX can realize a single-input multiple-output, that is, the ratio of n to m is greater than or equal to 2. In the embodiments of the present disclosure, both m and n are positive integers and d=n/m, for example, as shown in FIG. 1, d=2, n=2, and m=1, or as shown in FIG. 2, d=3, n=3, and m=1.

As shown in FIG. 1 and FIG. 2, in one touch electrode group 11 and one touch switch group 12 corresponding to the touch electrode group 11, output terminals of the multiplexers DX of the touch electrode group 11 are electrically connected to touch electrodes SR of the touch switch group 12 in one-to-one correspondence, that is, one touch electrode SR is electrically connected to one corresponding output terminal and one output terminal is electrically connected to one corresponding touch electrode SR. In a touch recognition phase, the touch switches ST in the multiplexer DX are turned on sequentially. While in the touch recognition phase, in one touch electrode group 11 and one touch switch group 12 that are the correspondingly arranged, the input terminals of the multiplexers can be sequentially electrically connected to one respective touch electrode SR.

As shown in FIG. 1, each of the plurality of multiplexers DX of the touch switch group 12 includes two touch switches ST, one of the two touch switches ST is electrically connected to a control line TP1, and the other one of the touch switches ST is electrically connected to a control line TP2. When the control line TP1 transmits a turn-on signal, one of the two touch switches ST in each multiplexer DX is turned on, so that the input terminal of one of the multiplexer DX is electrically connected to one touch electrode SR through one output terminal; and when the control line TP2 transmits a turn-on signal, the other one of the two touch switches ST in each multiplexer DX is turned on, so that the input terminal of the multiplexer DX is electrically connected to one touch electrode SR through another output terminal.

As shown in FIG. 2, each of the plurality of multiplexers DX in the touch switch group 12 includes three touch switches ST, a first touch switch ST of the three touch switches ST is electrically connected to a control line TP1, a second touch switch ST of the three touch switches ST is electrically connected to a control line TP2, and a third touch switch ST of the three touch switches ST is electrically connected to a control line TP3. When the control line TP1 transmits a turn-on signal, the first touch switch ST in each multiplexer DX is turned on, so that the input terminal of the multiplexer DX is electrically connected to one touch electrode SR through a first output terminal; when TP2 transmits a turn-on signal, the second touch switch ST of each multiplexer DX is turned on, so that the input terminal of the multiplexer DX is electrically connected to one touch electrode SR through a second output terminal; and when TP3 transmits a turn-on signal, the third touch switch ST of each multiplexer DX is turned on, so that the input terminal of the multiplexer DX is electrically connected to one touch electrode SR through a third output terminal.

The touch driving unit 20 includes a plurality of touch pin groups 21 and at least one touch analog front end group 22. Each touch pin group 21 includes a plurality of touch pins PN, and the touch pins PN are specific structures through which the touch driving unit 20 are bound to the display panel 10. Each touch analog front end group 22 includes a plurality of touch analog front ends, and as shown in FIG. 1 and FIG. 2, the touch analog front end group 22 includes a touch analog front end AFE11, a touch analog front end AFE12, a touch analog front end AFE13, a touch analog front end AFE14, a touch analog front end AFE15, and a touch analog front end AFE16. The touch analog front ends each are configured to process touch-related analog signals and transmit the processed touch-related analog signals to the touch electrodes SR and/or to a touch IC.

Each touch analog front end group 22 corresponds to at least two touch pin groups 21, and the plurality of touch pin groups 21 is arranged in one-to-one correspondence with the plurality of touch switch groups 12. Then, each touch analog front end group 22 is arranged in correspondence with at least two touch switch groups 12, that is, in correspondence with at least two touch electrode groups 11.

In one touch pin group 21 and one touch switch group 12 that are arranged in correspondence, the multiplexers DX respectively electrically connected to any two touch pins PN have a same number of input terminals. Then each touch pin PN can be electrically connected, through a multiplexer DX electrically connected thereto, to one touch electrode SR electrically connected to the multiplexer DX, and any two touch pins PN in the touch pin group 21 are electrically connected to a same number of touch electrodes SR.

In one touch pin group 21 and one touch analog front end group 22 corresponding to the touch pin group 21, any two touch analog front end are electrically connected to the same number of touch pins PN, and then the any two touch analog front ends are electrically connected to a same number of touch electrodes SR through touch pins PN electrically connected the two touch analog front ends and multiplexers DX electrically connected to the touch pins PN.

Figure 11:
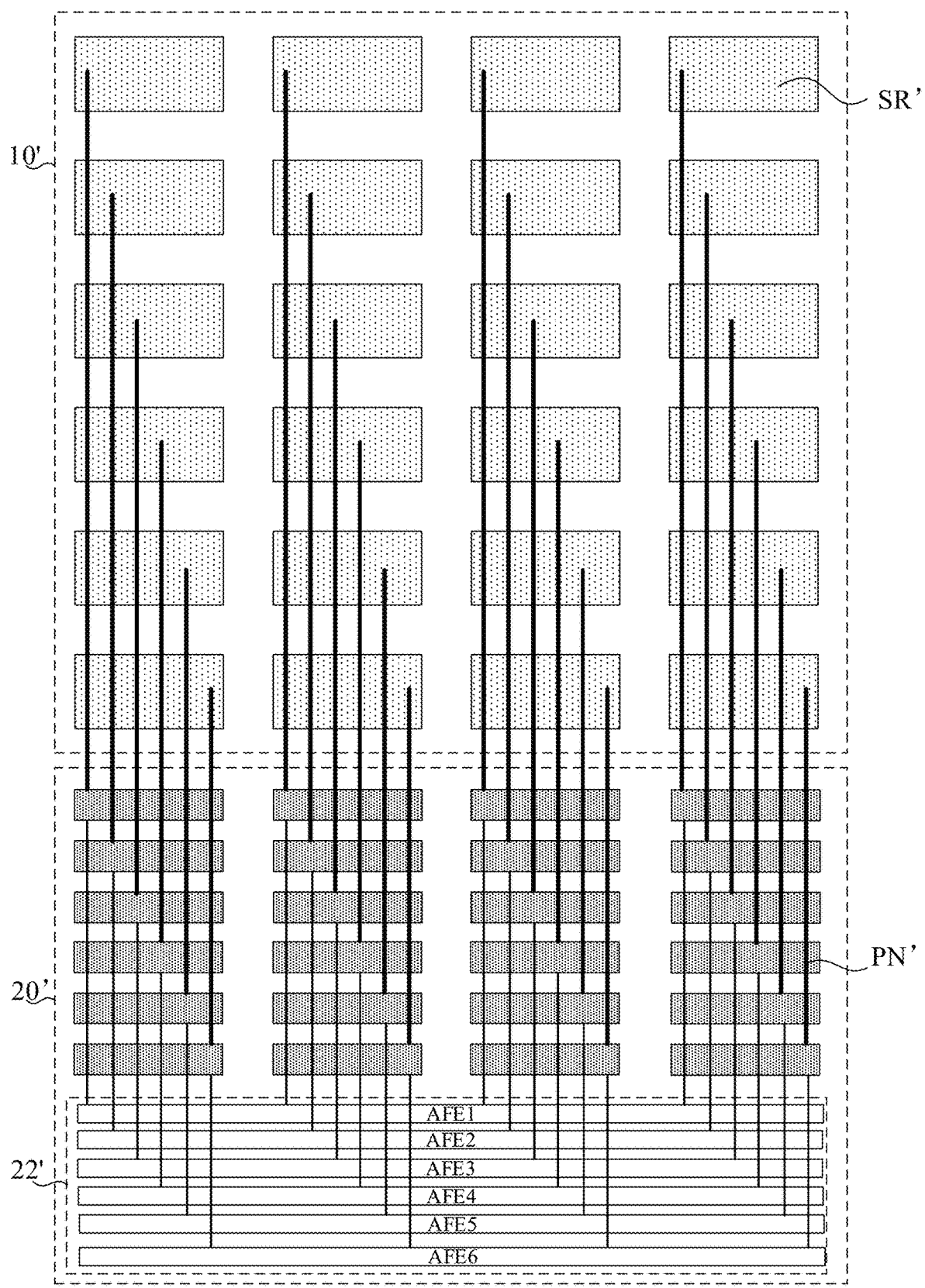
FIG. 11 is a schematic diagram of a display device integrated with touch recognition function in the related art.

FIG. 11 is a schematic diagram of a display device integrated with a touch recognition function in the related art. As shown in FIG. 11, a display panel 10' of a display device includes touch electrodes SR' arranged in rows and columns, a touch driving unit 20' of the display device includes a plurality of touch pins PN' and at least one touch analog front end group 22', and each touch analog front end group 22' is arranged in correspondence with multiple columns of touch electrodes SR. The number of touch pins PN' is the same as the number of touch electrodes SR', the touch electrodes SR' are electrically connected to the touch pins PN' in one-to-one correspondence, and the number of touch analog front ends in each touch analog front end group 22' is the same as the number of touch electrodes SR' in one column. As shown in FIG. 11, the number of touch electrodes SR in each column is six, and the number of touch analog front ends in the corresponding touch analog front end group 22' is six, which are touch analog front ends AFE1, AFE2, AFE3, AFE4, AFE5, and AFE6. In the touch recognition phase, the touch analog front ends in the touch analog front end group 22' can respectively process relevant touch signals of touch electrodes SR' of one column simultaneously, and the touch analog front ends in the touch analog front end group 22' process relevant touch signals of the touch electrodes SR' sequentially from one column to another column to complete the touch recognition. Assuming that the time for processing relevant touch signals of touch electrodes SR' of one column is t1, then the time for processing relevant touch signals of touch electrodes SR' in four columns in the display device shown in FIG. 11 will be 4*t1.

Comparing FIGS. 1-2 with FIG. 11 of the related art, the embodiments of the present disclosure add multiplexers DX between the display touch electrode SR and the touch pins PN, which can reduce the number of touch signal lines in the fan-shaped wiring area of the display panel 10, reduce the coupling capacitance between different signal lines in the fan-shaped wiring area and reduce the design difficulty of the signal lines in the fan-shaped wiring area. In this way, the number of ports of the touch driving unit 20 that are bound to the display panel can be reduced, which facilitates realizing of the narrow bezel of the display panel 10 and reduces the design difficulty of the touch driving unit 20. It should be noted that in a third direction along which the touch analog front end group 22 and the display panel are arranged, when the touch analog front ends of the touch analog front end group 22 have different distances from the display panel 10, the touch electrodes SR of the display panel 10 and the touch analog front ends are connected in a manner where some touch electrodes SR having a same distance from the touch analog front end group 22 are electrically connected to the touch analog front ends that are adjacent to each other along the third direction. That is, the touch analog front ends electrically connected to some touch electrodes SR located in a same row are adjacent to each other, and distances from the touch analog front ends electrically connected to the touch electrodes SR to the display panel 10 decrease as distances from the touch electrodes SR to touch analog front end groups 22 increase. With such configuration, signal lines between different touch electrodes SR and corresponding touch analog front ends have a substantially identical length, which reduces the distortion of touch signals caused by the difference between the coupling capacitance and the resistance of the signal line.

Figure 3:
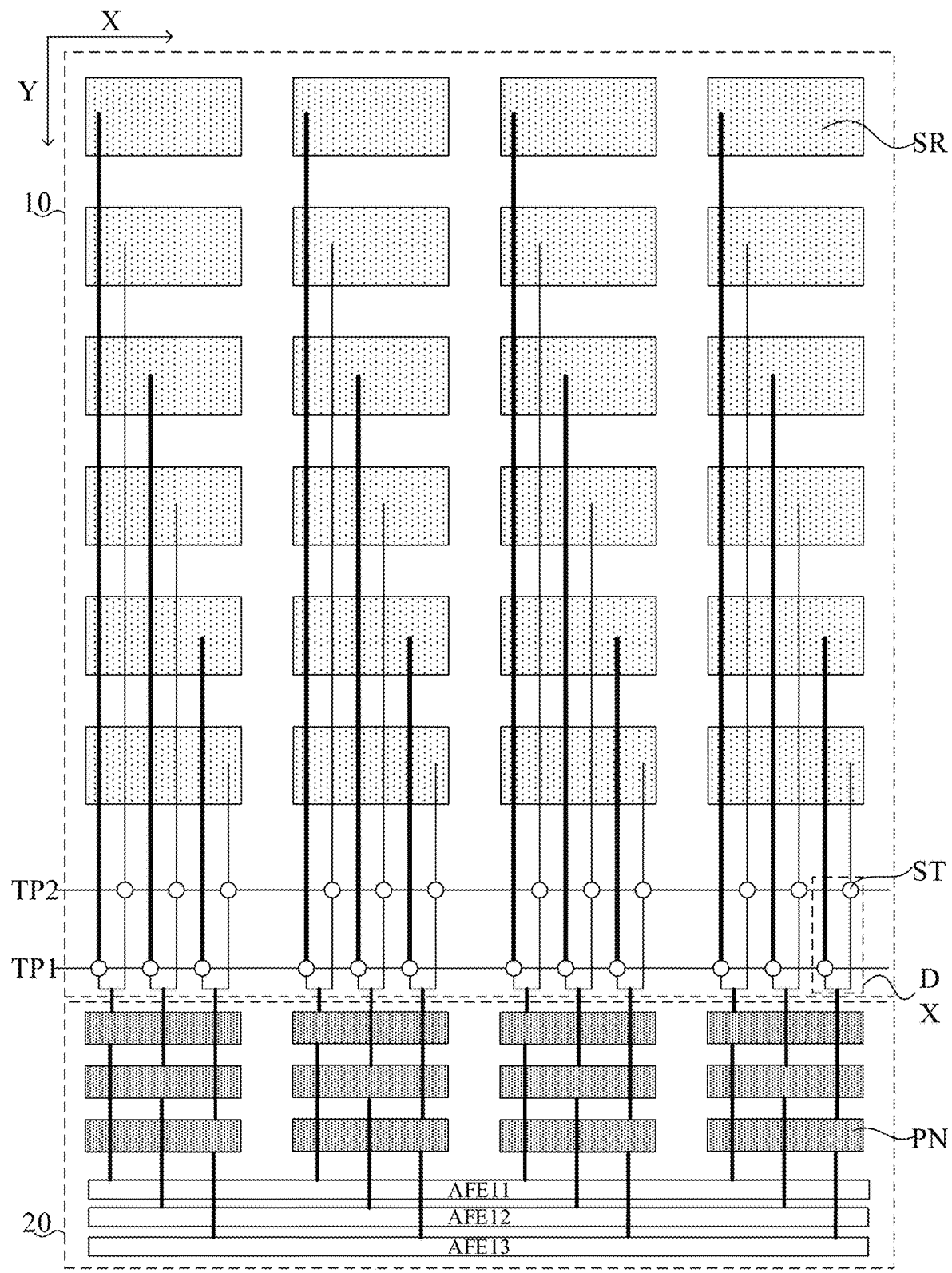
FIG. 3 is a schematic diagram of a display device related to an embodiment of the present disclosure.

FIG. 3 is a schematic diagram of a display device related to the embodiments of the present disclosure. It is found that when the multiplexers DX are provided between the display touch electrodes SR and the touch pins PN, according to the conventional design concept of the display device, multiplexers DX electrically connected to touch electrodes SR in one touch electrode column can be electrically connected to the touch analog front ends in the touch analog front end group 22 through touch pins PN, respectively, and each touch analog front end in the touch analog front end group 22 can be electrically connected to the touch electrodes SR in one touch electrode column through respective touch pins PN. In the touch recognition phase, due to the limitation of the number of touch analog front ends in the touch analog front end group 22, the touch driving unit 20 can only scan some of the touch electrodes SR in one touch electrode column simultaneously. As the touch electrodes SR in one column are connected to multiplexers DX, the touch electrodes SR in the column can be scanned in a time-division manner. Therefore, compared to the display device without the multiplexers DX, the display device shown in FIG. 3 at least doubles the time for scanning all touch electrodes SR. Compared with the touch recognition process of the display device shown in FIG. 11, the time to complete the scanning of relevant signals in one column of touch electrodes SR in the display device shown in FIG. 3 is 2*t1, then the time for processing related touch signals of the four columns of touch electrodes SR in the display device shown in FIG. 11 is 2*4*t1=8*t1.

In the display devices shown in FIG. 1 and FIG. 2, in the d touch electrode subgroups 110 arranged along the first direction X (each touch electrode subgroup 110 can be equivalent to one column of touch electrodes SR), multiplexers DX electrically connected to the touch electrodes SR can be electrically connected to the touch analog front ends in the touch analog front end group 22 through touch pins PN, respectively, and the touch analog front ends in the touch analog front end group 22 can be electrically connected to the touch electrodes SR in the d touch electrode subgroups 110 through touch pins PN, respectively. In the touch recognition phase, the touch driving unit 20 can simultaneously scan some of the touch electrodes in the d touch electrode subgroups 110 belonging to the same touch electrode group 11; since the ratio of the number of input terminals to the number of output terminals of the multiplexer DX electrically connected to the touch electrode SR is 1/d, the touch driving unit 20 scans d times to complete the scanning of all the touch electrodes SR in the d touch electrode subgroups 110. Therefore, the time of the touch recognition phase of the display device provided by the embodiments of the present disclosure will not increase compared to the related art. In a condition where the time for the touch analog front ends in the touch analog front end group 22 to process touch signals for one time is unchanged, the number of touch electrodes SR that can be processed during a time by the touch analog front ends in the touch analog front end group 22 shown in FIG. 1 and FIG. 2 is 1/d of the total number of touch electrodes SR in one touch electrode group 11, but the touch analog front ends in the touch analog front end group 22 can process touch signals of d touch electrodes at a time. Therefore, the time for the touch analog front end group 22 of the display device of the embodiments of the present disclosure to complete touch signal processing for a time for all touch electrodes SR in one touch electrode group 11 is the same as the time for the touch analog front end group 22' of the display device shown in FIG. 11 to complete touch signal processing for a time for d touch electrodes SR'.

In an embodiment, in the display devices provided by the embodiments of the present disclosure, the number of touch pins PN in any one touch pin group 21 electrically connected to each touch analog front end of the touch analog front end group 22 is the same, then any two touch analog front ends can electrically connected to the same number of touch electrodes SR through touch pins PN electrically connected to the two touch analog front ends and multiplexers DX electrically connected to the touch pins PN. Therefore, in the touch recognition phase, when one control line transmits the turn-on signal, the touch analog front ends in the touch analog front end group 22 are electrically connected to a same number of touch electrodes SR through the turned-on touch switches, so that the load of the touch analog front ends in the touch analog front end group 22 are basically the same.

In one touch pin group 21 and its corresponding touch analog front end group 22, the touch analog front ends of the touch analog front end group 22 are electrically connected to the touch pins PN of the touch pin group 21 in one-to-one correspondence. As shown in FIG. 1 and FIG. 2, in the touch analog front end group 22 and one corresponding touch pin group 21, the number of the touch pin PN electrically connected to each one of the touch analog front end AFE11, the touch analog front end AFE12, the touch analog front end AFE13, the touch analog front end AFE14, the touch analog front end AFE15 and the touch analog front end AFE16 is one, and any one touch pin PN is electrically connected to one of the touch analog front end AFE11, the touch analog front end AFE12, the touch analog front end AFE13, the touch analog front end AFE14, the touch analog front end AFE15, and the touch analog front end AFE16.

As shown in FIG. 1 and FIG. 2, in one touch pin group 21 and one touch switch group 12 corresponding thereto, input terminals of the multiplexers DX of the touch switch group 12 are electrically connected to the touch pins PN of the touch pin group 21 in one-to-one correspondence.

As shown in FIG. 1 and FIG. 2, any one of the touch analog front ends AFE is electrically connected to one touch pin PN in one touch pin group 21, i.e., electrically connected to one multiplexer of one touch switch group 12. That is, in the touch analog front end group 22, and one touch pin group 21, one touch switch group 12 and one touch electrode group 11 that are arranged in correspondence with the touch analog front end group 22, the number of the touch pin PN electrically connected to each of the touch analog front end AFE11, the touch analog front end AFE12, the touch analog front end AFE13, the touch analog front end AFE14, the touch analog front end AFE15 and the touch analog front end AFE16 is one, the number of the multiplexer DX electrically connected to any one of the touch pins PN in the touch pin group 21 is also one; and the number of output terminals of each multiplexer DX is m, then the m output terminals can be electrically connected, in a time-division manner, to n touch electrodes SR that are electrically connected to the multiplexer DX.

In an embodiment of the present disclosure, as shown in FIG. 1 and FIG. 2, different output terminals of the same multiplexer DX are electrically connected to different touch electrodes SR in the same touch electrode subgroup 110, respectively. That is, the touch electrodes SR electrically connected to the m output terminals of the multiplexer DX are arranged along the second direction Y.

In an embodiment, in the touch recognition phase, when some of the touch electrodes SR do not participate in the touch recognition, these touch electrodes that do not participate in the touch recognition generally form at least one touch electrode subgroup, which facilitates the touch recognition and saves time.

Figure 4:
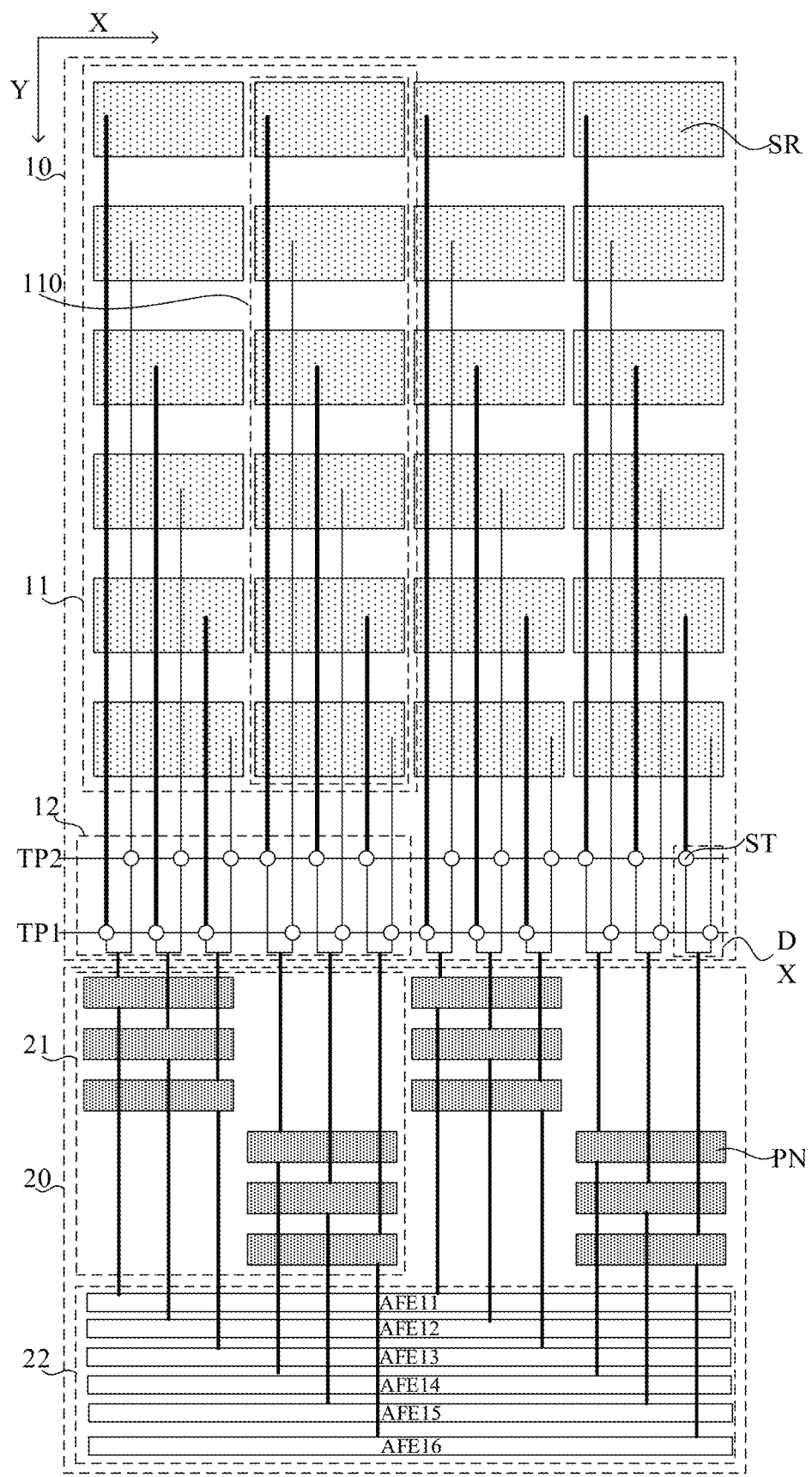
FIG. 4 is a schematic diagram of a display device provided by an embodiment of the present disclosure.

FIG. 4 is a schematic diagram of a display device provided by an embodiment of the present disclosure.

In an implementation of the embodiment of the present disclosure, as shown in FIG. 1, two touch electrode subgroups 110 in the touch electrode group 11 are adjacent to each other in the first direction X, one touch electrode SR in one of the two touch electrode subgroups 110 and one touch electrode SR in the other one of the two touch electrode subgroups 110 are adjacent to each other in the first direction X, and control terminals of touch switches ST respectively electrically connected to the two touch electrodes SR are electrically connected to the same control line. That is, control terminals of touch switches ST respectively electrically connected to the n touch electrodes SR arranged along the first direction X in the touch electrode group 11 are electrically connected to the same control line. Then in the touch recognition phase, the n touch electrodes SR arranged along the first direction X in the touch electrode group 11 are scanned by the touch driving unit 20 simultaneously.

For example, as shown in FIG. 1, when the control line TP1 transmits the turn-on signal, the touch analog front ends AFE11 to AFE16 are electrically connected to touch electrodes SR in odd rows in the touch electrode group 11 through touch pins PN in the touch pin group 21, respectively; when the control line TP2 transmits the turn-on signal, the touch analog front ends AFE11 to AFE16 are electrically connected to touch electrodes SR in even rows in the touch electrode group 11 through the touch pins PN in the touch pin group 21, respectively.

In the touch recognition phase, when some of the touch electrodes SR do not participate in the touch recognition, the touch electrodes that do not participate in the touch recognition can be located in the same row, which facilitates the touch recognition and saves time.

In an embodiment of the present disclosure, as shown in FIG. 4 and FIG. 2, two touch electrode subgroups 110 in the touch electrode group 11 are adjacent to each other in the first direction X, one touch electrode SR in one of the two touch electrode subgroup 110 and one touch electrode SR in the other one of the two touch electrode subgroup 110 are adjacent to each other in the first direction X, and control terminals of touch switches respectively electrically connected to the two touch electrodes SR are electrically connected to different control lines. That is, the control terminals of the touch switches ST respectively electrically connected to the n touch electrodes SR arranged along the first direction X in the touch electrode group 11 are electrically connected to different control lines, respectively. Then in the touch recognition phase, the n touch electrodes SR arranged along the first direction X in the touch electrode group 11 are scanned sequentially by the touch driving unit 20.

For example, as shown in FIG. 4, when the control line TP1 transmits the turn-on signal, the touch analog front ends AFE11 to AFE13 are electrically connected to odd-numbered touch electrodes SR in a first touch electrode subgroup 110 in the touch electrode group 11 through touch pins PN in the touch pin group 21, respectively; the touch analog front ends AFE14 to AFE16 are electrically connected to the even-numbered touch electrodes SR in a second touch electrode subgroup 110 in the touch electrode group 11 through touch pins PN in the touch pin group 21, respectively. When the control line TP2 transmits the turn-on signal, the touch analog front ends AFE11 to AFE13 are electrically connected to the even-numbered touch electrodes SR in the second touch electrode subgroup 110 in the touch electrode group 11 through the touch pins PN in the touch pin group 21, respectively; and the touch analog front ends AFE14 to AFE16 are electrically connected to the odd-numbered touch electrodes SR in the first touch electrode subgroup 110 in the touch electrode group 11 through the touch pins PN in the touch pin group 21, respectively.

For example, as shown in FIG. 2, when the control line TP1 transmits the turn-on signal, the touch analog front ends AFE11 and AFE12 are electrically connected to (3x−2)-th touch electrodes SR of the first touch electrode subgroup 110 in the touch electrode group 11 through the touch pins PN in the touch pin group 21, respectively, where x=1 and 2. That is, the touch analog front end AFE11 is electrically connected to the first touch electrode SR of the first touch electrode subgroup 110 in the touch electrode group 11 through the touch pin PN in the touch pin group 21, and the touch analog front end AFE12 is electrically connected to the fourth touch electrode SR of the first touch electrode subgroup 110 in the touch electrode group 11 through the touch pin PN in the touch pin group 2. The touch analog front ends AFE13 and AFE14 are electrically connected to 3x-th touch electrodes SR of the second touch electrode subgroup 110 in the touch electrode group 11 through the touch pins PN in the touch pin group 21, respectively, where x=1 and 2. In other words, the touch analog front end AFE13 is electrically connected to the third touch electrode SR of the second touch electrode subgroup 110 in the touch electrode group 11 through the touch pin PN in the touch pin group 21, and the touch analog front end AFE14 is electrically connected to the sixth touch electrode SR of the second touch electrode subgroup 110 in the touch electrode group 11 through the touch pin PN in the touch pin group 21. The touch analog front ends AFE15 and AFE16 are electrically connected to (3x−1)-th touch electrodes SR of the third touch electrode subgroup 110 in the touch electrode group 11 through the touch pins PN in the touch pin group 21, respectively, where x=1 and 2. That is, the touch analog front end AFE15 is electrically connected to the second touch electrode SR of the third touch electrode subgroup 110 in the touch electrode group 11 through the touch pin PN in the touch pin group 21, and the touch analog front end AFE16 is electrically connected to the fifth touch electrode SR of the third touch electrode subgroup 110 in the touch electrode group 11 through the touch pin PN in the touch pin group 21. When the control line TP2 transmits the turn-on signal, the touch analog front ends AFE11 and AFE12 are electrically connected to the (3x−1)-th touch electrodes SR of the first touch electrode subgroup 110 in the touch electrode group 11 through the touch pins PN in the touch pin group 21, respectively, where x=1 and 2. That is, the touch analog front end AFE11 is electrically connected to the second touch electrode SR of the first touch electrode subgroup 110 in the touch electrode group 11 through the touch pin PN in the touch pin group 21, and the touch analog front end AFE12 is electrically connected to the fifth touch electrode SR of the first touch electrode subgroup 110 in the touch electrode group 11 through the touch pin PN in the touch pin group 21. The touch analog front ends AFE13 and AFE14 are electrically connected to the (3x−2)-th touch electrodes SR of the second touch electrode subgroup 110 in the touch electrode group 11 through the touch pins PN in the touch pin group 21, respectively, where x=1 and 2. That is, the touch analog front end AFE13 is electrically connected to the first touch electrode SR of the second touch electrode subgroup 110 in the touch electrode group 11 through the touch pin PN in the touch pin group 21, and the touch analog front end AFE14 is electrically connected to the fourth touch electrode SR of the second touch electrode subgroup 110 in the touch electrode group 11 through the touch pin PN in the touch pin group 21. The touch analog front ends AFE15 and AFE16 are electrically connected to the 3x-th touch electrodes SR of the third touch electrode subgroup 110 in the touch electrode group 11 through touch pins PN in the touch pin group 21, respectively, where x=1 and 2. In other words, the touch analog front end AFE15 is electrically connected to the third touch electrode SR of the third touch electrode subgroup 110 in the touch electrode group 11 through the touch pin PN in the touch pin group 21, and the touch analog front end AFE16 is electrically connected to the sixth touch electrode SR of the third touch electrode subgroup 110 in the touch electrode group 11 through the touch pin PN in the touch pin group 21. When the control line TP3 transmits the turn-on signal, the touch analog front ends AFE11 and AFE12 are electrically connected to the 3x-th touch electrodes SR of the first touch electrode subgroup 110 in the touch electrode group 11 through the touch pins PN in the touch pin group 21, respectively, where x=1 and 2. That is, the touch analog front end AFE11 is electrically connected to the third touch electrode SR of the first touch electrode subgroup 110 in the touch electrode group 11 through the touch pin PN in the touch pin group 21, and the touch analog front end AFE11 is electrically connected to the sixth touch electrode SR of the first touch electrode subgroup 110 in the touch electrode group 11 through the touch pin PN in the touch pin group 21. The touch analog front ends AFE13 and AFE14 are electrically connected to the (3x−1)-th touch electrodes SR of the second touch electrode subgroup 110 in the touch electrode group 11 through the touch pins PN in the touch pin group 21, respectively, where x=1 and 2. That is, the touch analog front end AFE13 is electrically connected to the second touch electrode SR of the second touch electrode subgroup 110 in the touch electrode group 11 through the touch pin PN in the touch pin group 21, and the touch analog front end AFE14 is electrically connected to the fifth touch electrode SR of the second touch electrode subgroup 110 in the touch electrode group 11 through the touch pin PN in the touch pin group 21. The touch analog front ends AFE15 and AFE16 are electrically connected to the (3x−2)-th touch electrodes SR of the third touch electrode subgroup 110 in the touch electrode group 11 through the touch pins PN in the touch pin group 21, respectively, where x=1 and 2. That is, the touch analog front end AFE15 is electrically connected to the first touch electrode SR of the third touch electrode subgroup 110 in the touch electrode group 11 through the touch pin PN in the touch pin group 21, and the touch analog front end AFE16 is electrically connected to the fourth touch electrode SR of the third touch electrode subgroup 110 in the touch electrode group 11 through the touch pin PN in the touch pin group 21.

In the embodiment, when performing touch recognition, touch electrodes located in different rows in different touch electrode subgroups 110 in the same touch electrode group 11 are scanned simultaneously, that is, each column and each row have touch electrodes SR can be scanned simultaneously to realize the accuracy of touch recognition.

In an embodiment, as shown in FIG. 1, FIG. 2 and FIG. 4, when the touch electrodes SR electrically connected to the n output terminals of each multiplexer DX are arranged along the second direction Y, touch electrodes SR respectively electrically connected to different output terminals of the same multiplexer DX are adjacent along the second direction Y.

In an embodiment, when n=2, m=1 and the touch electrodes SR respectively electrically connected to different output terminals of the same multiplexer DX are adjacent along the second direction Y, in any one of the touch electrode subgroups 110, two touch electrodes SR are spaced apart from each other by one touch electrode SR, a control terminal of a touch switch ST electrically connected to one of the two touch electrodes SR and a control terminal of a touch switch ST electrically connected to the other one of the two touch electrodes SR are electrically connected to the same control line.

Taking the right touch electrode subgroup 110 in the left touch electrode group 11 of the display device shown in FIG. 1 as an example, one touch electrode SR is provided between a first touch electrode SR and a third touch electrode SR, and the control terminal of the touch switch ST electrically connected to the first touch electrode SR and the control terminal of the touch switch ST electrically connected to the third touch electrode SR are electrically connected to the control line TP1; one touch electrode SR is provided between a second touch electrode SR and a fourth touch electrode SR, and the control terminal of the touch switch ST electrically connected to the second touch electrode SR and the control terminal of the touch switches ST electrically connected to the fourth touch electrode SR are electrically connected to the control line TP2.

Taking the right touch electrode subgroup 110 in the left touch electrode group 11 of the display device shown in FIG. 4 as an example, one touch electrode SR is provided between a first touch electrode SR and a third touch electrode SR, and a control terminal of the touch switch ST electrically connected to the first touch electrode SR and the control terminal of the touch switch ST electrically connected to the third touch electrode SR are electrically connected to the control line TP2. In the illustrated embodiment, and one touch electrode SR is provided between a second touch electrode SR and a fourth touch electrode SR, and a control terminal of the touch switch ST electrically connected to the second touch electrode SR and a control terminal of the touch switches ST electrically connected to the fourth touch electrodes SR are electrically connected to the control line TP1.

In an embodiment, when n=3, m=1 and the touch electrodes SR respectively electrically connected to different output terminals of the same multiplexer DX are adjacent along the second direction Y, in any one of the touch electrode subgroups 110, two touch electrodes SR are spaced apart from each other by two touch electrodes SR, a control terminal of a touch switch ST electrically connected to one of the two touch electrodes SR and a control terminal of a touch switch ST electrically connected to the other one of the two touch electrodes SR are electrically connected to a same control line.

Taking the middle touch electrode subgroup 110 in the left touch electrode group 11 of the display device shown in FIG. 2 as an example, two touch electrodes SR are provided between a first touch electrode SR and a fourth touch electrode SR, and a control terminal of a touch switch ST electrically connected to the first touch electrode SR and a control terminal of a touch switch ST electrically connected to the fourth touch electrode SR are electrically connected to a control line TP2; two touch electrodes SR are provided between a second touch electrode SR and a fifth touch electrode SR, and a control terminal of a touch switch ST electrically connected to the second touch electrode SR and a control terminal of a touch switches ST electrically connected to the fifth touch electrodes SR are electrically connected to a control line TP3. In the illustrated embodiment, and two touch electrodes SR are provided between a third touch electrode SR and a sixth touch electrode SR, and a control terminal of a touch switch ST electrically connected to a third touch electrode SR and a control terminal of a touch switches ST electrically connected to the sixth touch electrodes SR are electrically connected to a control line TP1.

Figure 5:
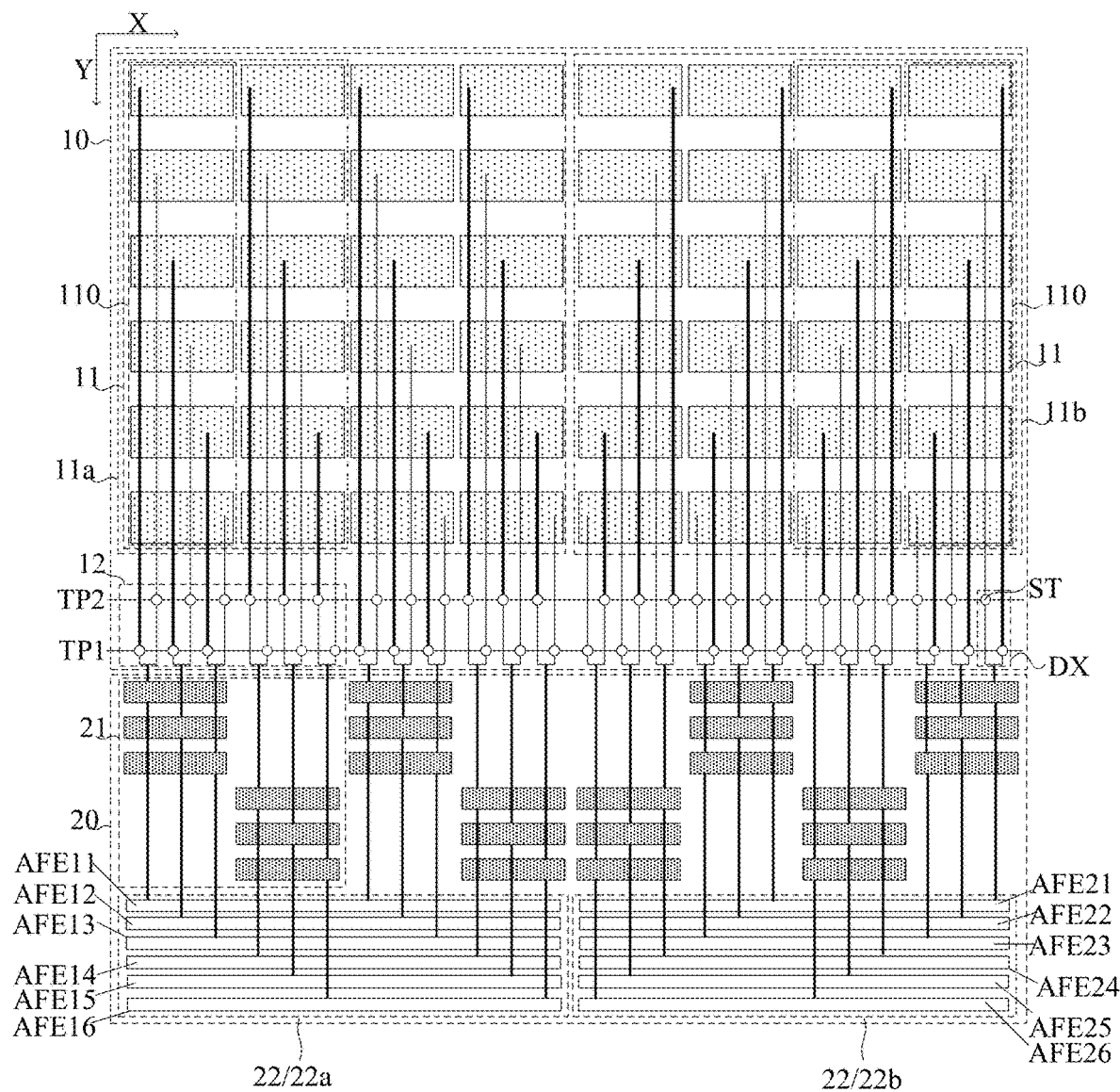
FIG. 5 is a schematic diagram of a display device provided by an embodiment of the present disclosure.
Figure 6:
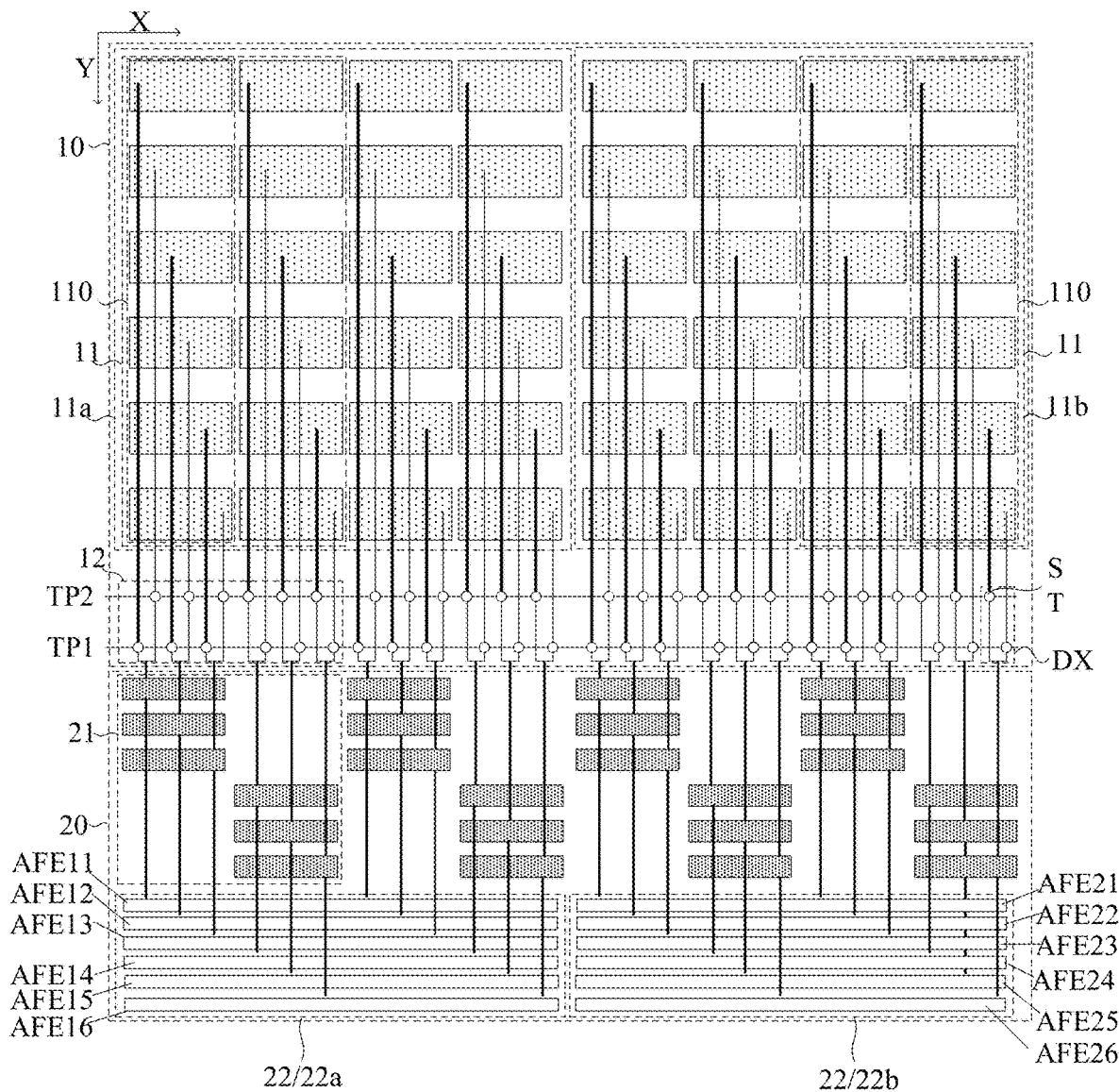
FIG. 6 is a schematic diagram of a display device provided by an embodiment of the present disclosure.

FIG. 5 is a schematic diagram of a display device provided by an embodiment of the present disclosure, and FIG. 6 is a schematic diagram of a display device provided by an embodiment of the present disclosure.

In an embodiment of the present disclosure, in the display devices shown in FIG. 5 and FIG. 6, the touch driving unit 20 includes a first touch analog front end group 22a and a second touch analog front end group 22b. The plurality of touch electrode groups 11 of the display panel 10 includes a first set 11a of touch electrode groups and a second set 11b of touch electrode groups, and the number of touch electrode groups 11 in the first set 11a of touch electrode groups and the number of touch electrode groups 11 in the second set 11b of touch electrode groups are equal to equal to each other and each are greater than or equal to 2. As shown in FIG. 5 and FIG. 6, the first set 11a of touch electrode groups and the second set 11b of touch electrode groups each include two touch electrode groups 11, and the first set 11a of touch electrode groups and the second set 11b of touch electrode groups in the actual application product can include more than two touch electrode groups 11. In an embodiment, the first touch analog front end group 22a and the second touch analog front end group 22b each include the same number of touch analog front ends. As shown in FIG. 5 and FIG. 6, the first touch analog front end group 22a includes six touch analog front ends, i.e., AFE11 to AFE16, and the second touch analog front end group 22b includes six touch analog front ends, i.e., AFE21 to AFE26.

One of two touch analog front end groups 22 of the touch driving unit 20 arranged in correspondence with the touch electrode groups 11 in the first set 11a of touch electrode groups, and the other one of the two touch analog front end group 22 is arranged in correspondence with the touch electrode groups 11 in the second set 11b of touch electrode groups. As shown in FIG. 5 and FIG. 6, the first touch analog front end group 22a corresponds to the touch electrode group 11 in the first set 11a of touch electrode groups, and the second touch analog front end group 22b corresponds to the touch electrode group 11 in the second set 11b of touch electrode groups. The corresponding arrangement described herein is the same as the corresponding relationship between the touch analog front end group 11 and the touch pin group 21 and the corresponding relationship between the touch electrode group 11 and the touch pin group 21, which are provided by any one of the embodiments in FIG. 1, FIG. 2 and FIG. 4 and will not be repeated herein.

By providing a plurality of touch analog front end groups 22, the plurality of touch analog front end groups 22 can process touch-related signals of some of the touch electrodes SR in the plurality of touch electrode groups 11 simultaneously, thereby shortening the time of the touch recognition phase.

In an embodiment, the first set 11a of touch electrode groups and the second set 11b of touch electrode groups are symmetrical in the first direction X. That is, a central axis extending along the second direction Y in the display panel 10 is the symmetry axis of the first set 11a of touch electrode groups and the second set 11b of touch electrode groups.

In an embodiment, as shown in FIG. 5, two touch electrode subgroups 110 in the display panel are symmetrical in the first direction X, one touch electrode SR in one of the two touch electrode subgroups 110 and one touch electrode SR in the other one of the two touch electrode subgroups 110 are arranged along the first direction X, and control terminals of touch switches respectively electrically connected to the two touch electrodes SR are electrically connected to a same control line. As shown in FIG. 5, the touch electrode SR in the upper left corner of the first set 11a of touch electrode groups is symmetrical to the touch electrode SR in the upper right corner of the second set 11b of touch electrode groups in the first direction. The control terminal of the touch switch electrically connected to the touch electrode SR in the upper left corner of the first set 11a of touch electrode groups, and the control terminal of the touch switch electrically connected to the touch electrode SR in the upper right corner of the second set 11b of touch electrode groups are each electrically connected to a control line TP1.

In an embodiment, as shown in FIG. 6, two touch electrode subgroups 110 in the display panel 10 are symmetrical in the first direction X, one touch electrode SR in one of the two touch electrode subgroups 110 and one touch electrode SR in the other one of the two touch electrode subgroups 110 are arranged along the first direction X, and control terminals of touch switches respectively electrically connected to the two touch electrodes SR are electrically connected to different control lines, respectively. As shown in FIG. 6, the touch electrode SR in the upper left corner of the first set 11a of touch electrode groups and the touch electrode SR in the upper right corner of the second set 11b of touch electrode groups are symmetrical in the first direction, the control terminal of the touch switch electrically connected to the touch electrode SR in the upper left corner of the first set 11a of touch electrode groups is electrically connected to a control line TP1, and the control terminal of the touch switch electrically connected to the touch electrode SR in the upper right corner of the second set 11b of touch electrode groups is electrically connected to a control line TP2.

In an embodiment of the present disclosure, the touch driving unit 20 further includes a touch IC, and the touch analog front ends in the touch analog front end group 22 are all bound to the touch IC and electrically connected to the touch pins PN. The touch IC can be configured to process the signal of the touch analog front ends.

Figure 7:
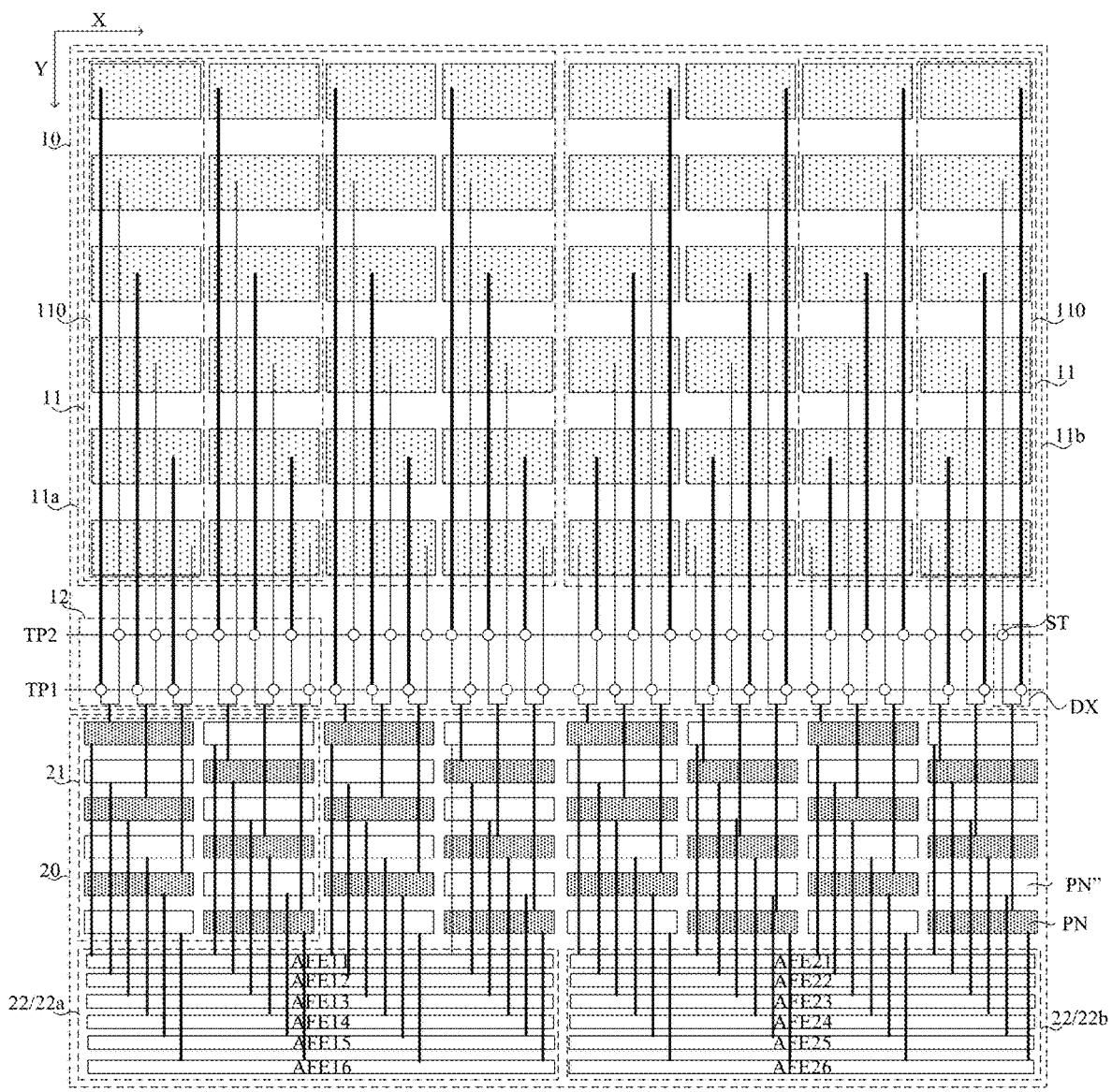
FIG. 7 is a schematic diagram of a display device provided by an embodiment of the present disclosure.
Figure 8:
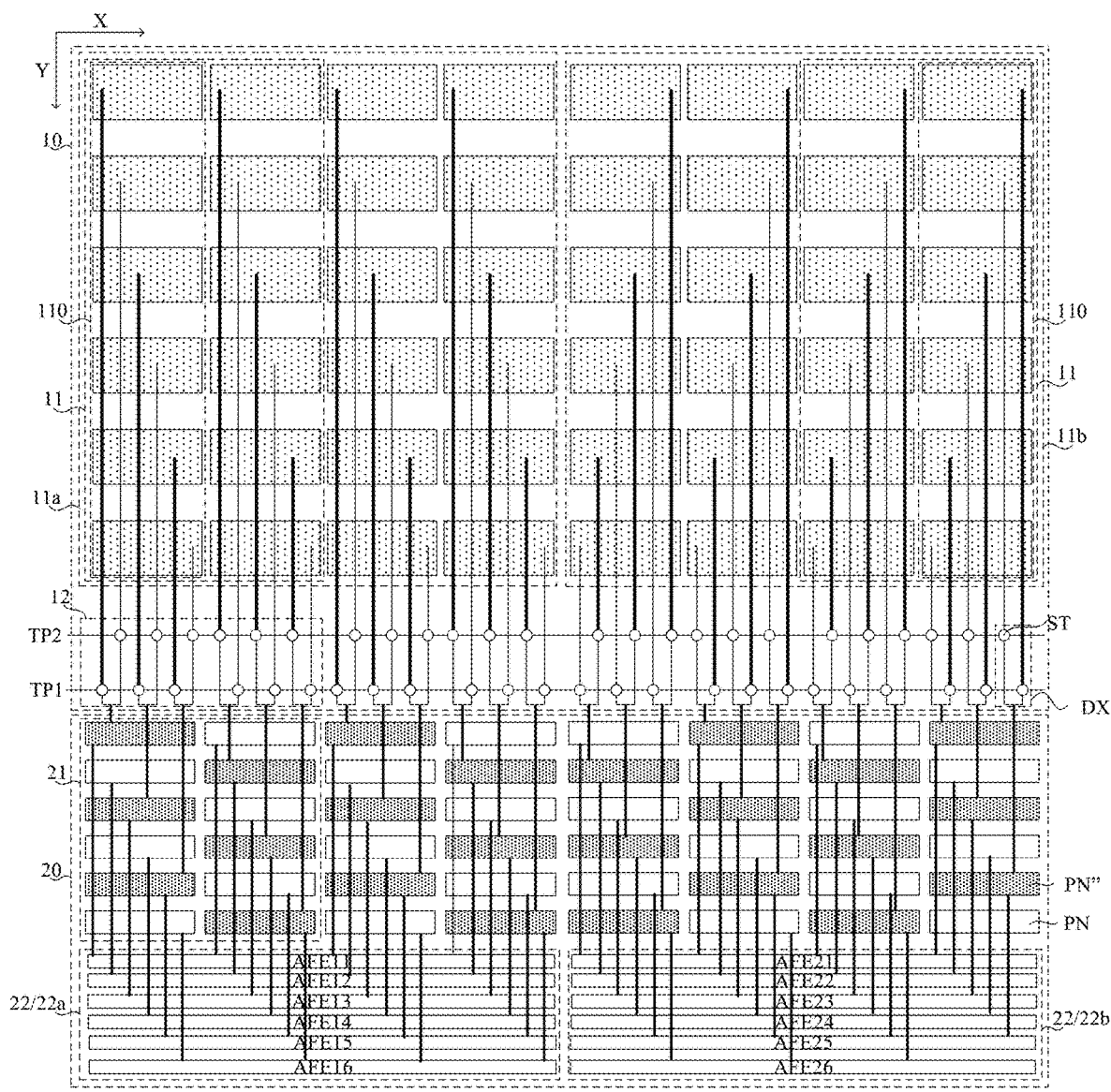
FIG. 8 is a schematic diagram of a display device provided by an embodiment of the present disclosure.

FIG. 7 is a schematic diagram of a display device provided by an embodiment of the present disclosure, and FIG. 8 is a schematic diagram of a display device provided by an embodiment of the present disclosure.

In an embodiment of the present disclosure, the touch driving unit 20 in the display device provided by the embodiment of the present disclosure can use the touch driving unit of the display device in the related art, but because the display panel 10 of the display device in the embodiment of the present disclosure is provided with the multiplexers DX, then the number of touch-related pins on the display panel 10 is smaller than the number of touch pins in the touch driving unit 20. Therefore, when the touch driving unit 20 of the display device provided in the embodiment of the present disclosure adopts the touch driving unit in the related art, some of the touch pins in the touch driving unit 20 can be non-occupied touch pins, i.e., these touch pins are not bound to the display panel 10.

As shown in FIG. 7 and FIG. 8, in addition to the touch pins PN in any one of the above embodiments, the touch driving unit 20 in the display device further includes non-occupied touch pins PN". The non-occupied touch pins PN" in the touch driving unit in the related art are bound to the touch-related pins in the touch display panel and electrically connected to the touch analog front ends. However, in embodiments of the present disclosure, the non-occupied touch pins PN" are not bound to the touch-related pins in the touch display panel 10 and not electrically connected to the touch analog front ends.

In an embodiment, as shown in FIG. 8, two touch electrode subgroups 110 are symmetrical in the first direction X in the display panel 10, each touch electrode SR in one of the two touch electrode subgroups 110 corresponds to an odd-numbered touch analog front end in the corresponding touch analog front end group 22, and each touch electrode SR in the other one of the two touch electrode subgroups 110 corresponds to an odd-numbered touch analog front end in the corresponding touch analog front end group 22; or, each touch electrode SR in one of the two touch electrode subgroups 110 corresponds to an even-numbered touch analog front end in the corresponding touch analog front end group 22 and each touch electrode SR in the other one of the two touch electrode subgroups 110 corresponds to an even-numbered touch analog front end in the corresponding touch analog front end group 22.

In an embodiment, as shown in FIG. 7, two touch electrode subgroups 110 are symmetrical in the first direction X in the display panel 10, each touch electrode SR in one of the two touch electrode subgroups 110 corresponds to an odd-numbered touch analog front end in the corresponding touch analog front end group 22, and each touch electrode SR in the other one of the two touch electrode subgroups 110 corresponds to an even-numbered touch analog front end in the corresponding touch analog front end group 22.

Figure 9:
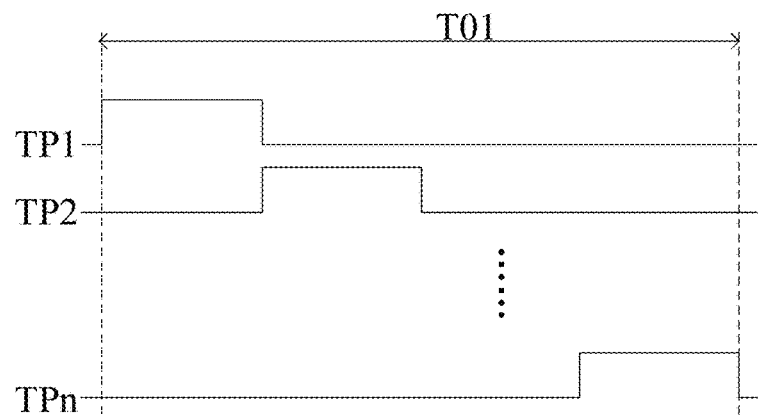
FIG. 9 is a timing sequence of a display device in a touch recognition phase provided by an embodiment of the present disclosure.

FIG. 9 is a timing sequence of a display device provided by the embodiment of the present disclosure in touch recognition phase.

An embodiment of the present disclosure provides a method for driving a display device, which is used to drive the display device provided in any one of the above embodiments to perform touch recognition. The timing sequence shown in FIG. 9 is a touch recognition phase T01 in which the touch electrodes SR in the display panel 10 are scanned. As shown in FIG. 9, in one touch recognition phase T01, the control lines TP1, TP2, . . . , TPn respectively electrically connected to the n touch switches of each multiplexer DX transmit a turn-on signal (such as a high level signal) sequentially, then the n touch switches in the multiplexer DX are turned on sequentially.

Figure 10:
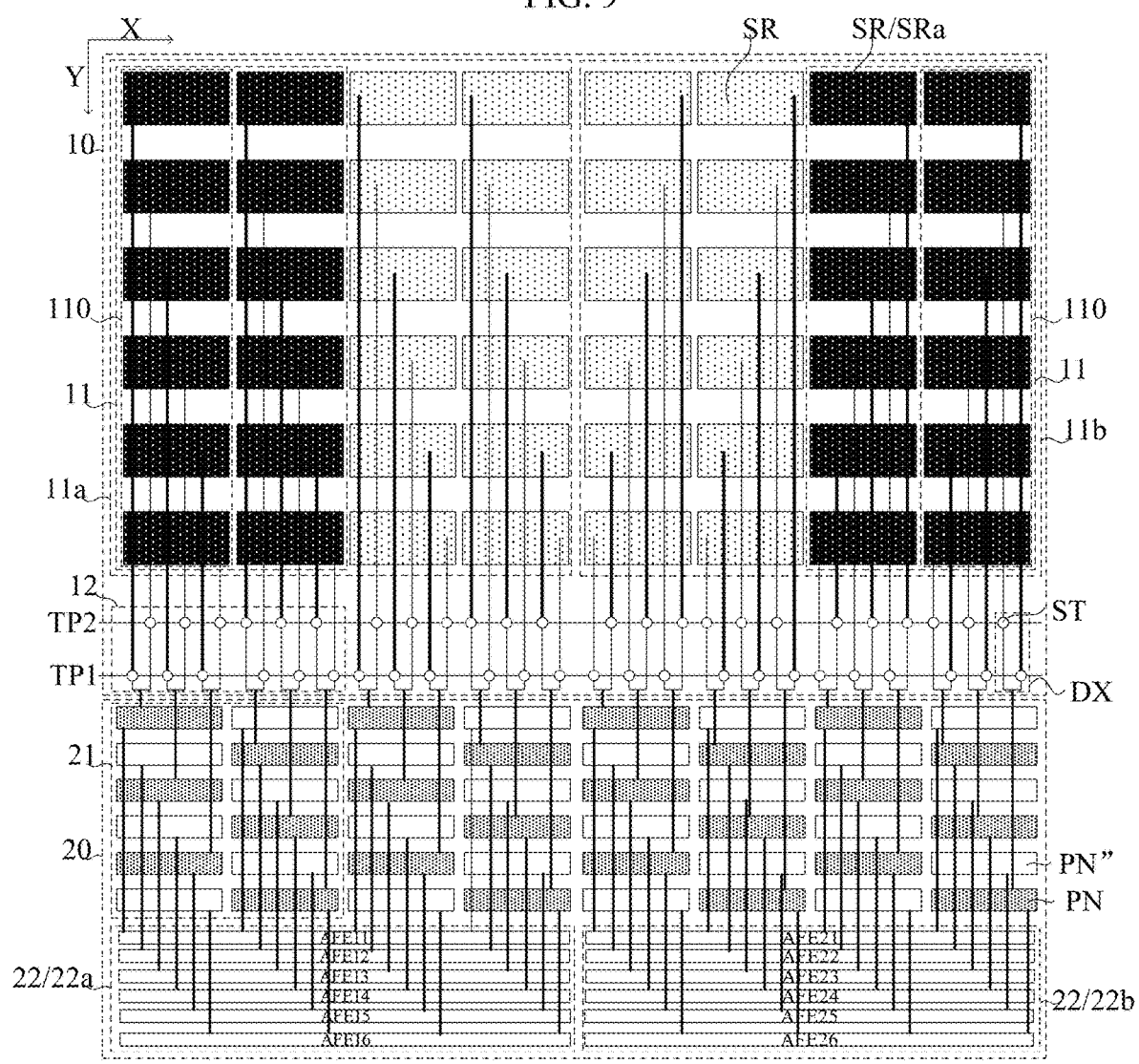
FIG. 10 is a schematic diagram of a display device in a touch recognition phase, according to an embodiment of the present disclosure.

FIG. 10 is a schematic diagram of a display device provided by an embodiment of the present disclosure in touch recognition phase.

As shown in FIG. 10, in the touch recognition phase, when touch electrodes SRa in a plurality of touch electrode subgroups 110 are all floating, n touch electrode subgroups 110 including the floating touch electrodes SRa belong to a same touch electrode group 11.

As shown in FIG. 10, touch electrodes SRa in at least two touch electrode groups 11 are all floating, and two touch electrode groups 11 including the floating touch electrodes SRa are symmetrical to each other in the first direction X.

The above are only some embodiments of the present disclosure and are not intended to limit the present disclosure. Those skilled in the art can make modifications, equivalent replacements, improvements within the principle of the present disclosure.

What is claimed is:

1. A display device, comprising a display panel and a touch driving unit,
   - wherein the display panel comprises a plurality of touch electrode groups and a plurality of touch switch groups that is arranged in one-to-one correspondence with the plurality of touch electrode groups, wherein each of the plurality of touch electrode groups comprises d touch electrode subgroups arranged along a first direction, each of the d touch electrode subgroups comprises a plurality of touch electrodes arranged along a second direction, and the first direction intersects with the second direction;
   - wherein each of the plurality of touch switch groups comprises a plurality of multiplexers, wherein each of the plurality of multiplexers comprises n touch switches, m input terminals, and n output terminals, wherein the n touch switches are electrically connected to the n output terminals in one-to-one correspondence, where d, m, and n each are a positive integer and d=n/m;
   - wherein the touch electrodes of one of the plurality of touch electrode groups are electrically connected to the output terminals of one of the plurality of touch switch groups in one-to-one correspondence, and the one of the plurality of touch switch groups corresponds to the one of the plurality of touch electrode groups;
   - wherein the touch driving unit comprises a plurality of touch pin groups and at least one touch analog front end group, wherein each of the at least one touch analog front end group is arranged in correspondence with at least two touch pin groups of the plurality of touch pin groups, each of the plurality of touch pin groups comprises a plurality of touch pins, each of the at least one touch analog front end group comprises a plurality of touch analog front ends; and in one of the plurality of touch pin groups and one of the at least one touch analog front end group corresponding thereto, every two touch analog front ends of the touch analog front end group are electrically connected to a same number of the touch pins of the plurality of touch pin groups; and
   - wherein the plurality of touch pin groups is arranged in one-to-one correspondence with the plurality of touch switch groups; and in one of the plurality of touch pin groups and one of the plurality of touch switch groups corresponding thereto, the input terminals of the touch switch group are electrically connected to the touch pins of the touch pin group and every two touch pins of the touch pin group are electrically connected to a same number of the input terminals of the touch switch group.

2. The display device according to claim 1, wherein the touch analog front ends of one of the at least one touch analog front end group are electrically connected, in one-to-one correspondence, to the touch pins of one of the plurality of touch pin groups corresponding to the touch analog front end group.

3. The display device according to claim 1, wherein the input terminals of the touch switch group are electrically connected to the touch pins of the touch pin group in one-to-one correspondence.

4. The display device according to claim 1, wherein at least two output terminals of the n output terminals of one of the plurality of multiplexers are electrically connected to at least two touch electrodes of one of the d touch electrode subgroups, respectively.

5. The display device according to claim 4, wherein two touch electrode subgroups of the d touch electrode subgroups of each of the plurality of touch electrode groups are adjacent to each other in the first direction, and a first touch electrode of the plurality of touch electrodes of one of the two touch electrode subgroups and a second touch electrode of the plurality of touch electrodes of the other one of the two touch electrode subgroups are adjacent to each other in the first direction, and a control terminal of one of the n touch switches electrically connected to the first touch electrode and a control terminal of another one of the n touch switches electrically connected to the second touch electrode are electrically connected to one of control lines.

6. The display device according to claim 4, wherein two touch electrode subgroups of the d touch electrode subgroups of each of the plurality of touch electrode groups are adjacent to each other in the first direction, and a first touch electrode of the plurality of touch electrodes of one of the two touch electrode subgroups and a second touch electrode of the plurality of touch electrodes of the other one of the two touch electrode subgroups are adjacent to each other in the first direction, and a control terminal of one of the n touch switches electrically connected to the first touch electrode and a control terminal of another one of the n touch switches electrically connected to the second touch electrode are electrically connected to two of control lines, respectively.

7. The display device according to claim 4, wherein two touch electrode subgroups of the d touch electrode subgroups of each of the plurality of touch electrode groups are adjacent to each other in the first direction, and a first touch electrode of the plurality of touch electrodes of one of the two touch electrode subgroups and a second touch electrode of the plurality of touch electrodes of the other one of the two touch electrode subgroups are adjacent to each other in the first direction, and a control terminal of one of the n touch switches electrically connected to the first touch electrode and a control terminal of another one of the n touch switches electrically connected to the second touch electrode are electrically connected to one of control lines or are electrically connected to two of the control lines, respectively; and wherein adjacent touch electrodes of the d touch electrode of each of the plurality of touch electrode groups are electrically connected to output terminals of the n output terminals of one of the plurality of multiplexers, respectively, and are arranged along the second direction.

8. The display device according to claim 7, wherein n=2 and m=1; and wherein two touch electrodes of the plurality of touch electrodes of one of the d touch electrode subgroups are separated by one of the plurality of touch electrodes, and a control terminal of one of the n touch switches of one of the plurality of multiplexers and a control terminal of one of the n touch switches of another one of the plurality of multiplexers are electrically connected to the two touch electrodes, respectively, and are electrically connected to one of the control lines.

9. The display device according to claim 7, wherein n=3 and m=1; and wherein two touch electrodes of the plurality of touch electrodes of one of the d touch electrode subgroups are separated by two of the plurality of touch electrodes, and a control terminal of one of the n touch switches of one of the plurality of multiplexers and a control terminal of one of the n touch switches of another one of the plurality of multiplexers are electrically connected to the two touch electrodes, respectively, and are electrically connected to one of the control lines.

10. The display device according to claim 4, wherein the at least one touch analog front end group comprises two touch analog front end groups;

wherein the plurality of touch electrode groups comprises a first set of touch electrode groups and a second set of touch electrode groups, and a number of touch electrode groups of the first set of touch electrode groups is the same as a number of touch electrode groups of the second set of touch electrode groups; and wherein one of the two touch analog front end groups is arranged in correspondence with at least two of the plurality of touch electrode groups of the first set of touch electrode groups, and the other one of the two touch analog front end groups is arranged in correspondence with at least two of the plurality of touch electrode groups of the second set of touch electrode groups.

11. The display device according to claim 10, wherein the first set of touch electrode groups and the second set of touch electrode groups are symmetrical in the first direction.

12. The display device according to claim 10, wherein two of the touch electrode subgroups of the display panel are symmetrical in the first direction, one of the plurality of touch electrodes of one of the two of the touch electrode subgroups and one of the plurality of touch electrodes of the other one of the two of the touch electrode subgroups are arranged along the first direction, and are respectively electrically connected to control terminals of the touch switches of the display panel, and the control terminals are electrically connected to two of control lines, respectively.

13. The display device according to claim 10, wherein two of the touch electrode subgroups of the display panel are symmetrical in the first direction, one of the plurality of touch electrodes of one of the two of the touch electrode subgroups and one of the plurality of touch electrodes of the other one of the two of the touch electrode subgroups are arranged along the first direction, and are respectively electrically connected to control terminals of the touch switches of the display panel, and the control terminals are electrically connected to one of control lines.

14. The display device according to claim 1, wherein the touch driving unit further comprises a touch IC, and each of the plurality of touch analog front ends is bound to the touch IC and is electrically connected to one of the touch pins of the plurality of touch pin groups.

15. A method for driving a display device to recognize touches, wherein the display device comprises a display panel and a touch driving unit, wherein the display panel comprises a plurality of touch electrode groups and a plurality of touch switch groups that is arranged in one-to-one correspondence with the plurality of touch electrode groups, wherein each of the plurality of touch electrode groups comprises d touch electrode subgroups arranged along a first direction, each of the d touch electrode subgroups comprises a plurality of touch electrodes arranged along a second direction, and the first direction intersects with the second direction;

wherein each of the plurality of touch switch groups comprises a plurality of multiplexers, wherein each of the plurality of multiplexers comprises n touch switches, m input terminals, and n output terminals, wherein the n touch switches are electrically connected to the n output terminals in one-to-one correspondence, where d, m, and n each are a positive integer and d=n/m;

wherein the touch electrodes of one of the plurality of touch electrode groups are electrically connected to the output terminals of one of the plurality of touch switch groups in one-to-one correspondence, and the one of the plurality of touch switch groups corresponds to the one of the plurality of touch electrode groups;

wherein the touch driving unit comprises a plurality of touch pin groups and at least one touch analog front end group, wherein each of the at least one touch analog front end group is arranged in correspondence with at least two touch pin groups of the plurality of touch pin groups, each of the plurality of touch pin groups comprises a plurality of touch pins, each of the at least one touch analog front end group comprises a plurality of touch analog front ends; and in one of the plurality of touch pin groups and one of the at least one touch analog front end group corresponding thereto, every two touch analog front ends of the touch analog front end group are electrically connected to a same number of the touch pins of the plurality of touch pin groups;

wherein the plurality of touch pin groups is arranged in one-to-one correspondence with the plurality of touch switch groups; and in one of the plurality of touch pin groups and one of the plurality of touch switch groups corresponding thereto, the input terminals of the touch switch group are electrically connected to the touch pins of the touch pin group and every two touch pins of the touch pin group are electrically connected to a same number of the input terminals of the touch switch group; and wherein the method comprises:
in a touch recognition phase, turning on the n touch switches of each of the plurality of multiplexers.

16. The method according to claim 15, wherein in the touch recognition phase, when each of the plurality of touch electrodes of at least two touch electrode subgroups of the d touch electrode subgroups is floating, n touch electrode subgroups of the at least two touch electrode subgroups are located in one of the plurality of touch electrode groups.

17. The method according to claim 16, wherein each of the plurality of touch electrodes of the d touch electrode subgroups of each of at least two touch electrode groups of the plurality of touch electrode groups is floating, and two touch electrode groups of the at least two touch electrode groups are symmetrical in the first direction.

* * * * *